United States Patent [19]

Berlinghoff et al.

[11] Patent Number: 5,102,340
[45] Date of Patent: Apr. 7, 1992

[54] DENTAL TEACHING AND PRACTICING APPARATUS

[75] Inventors: Frank Berlinghoff; Hans-Walter Lang, both of Leutkirch, Fed. Rep. of Germany

[73] Assignee: Kaltenbach & Voigt GmbH & Co., Biberach an der Riss, Fed. Rep. of Germany

[21] Appl. No.: 621,340

[22] Filed: Dec. 3, 1990

[30] Foreign Application Priority Data

Dec. 14, 1989 [DE] Fed. Rep. of Germany ....... 3941333

[51] Int. Cl.$^5$ .............................................. G09B 23/28
[52] U.S. Cl. ..................... 434/263; 312/209; 108/145; 280/47.35; 433/79
[58] Field of Search ............... 434/262, 263, 267, 270, 434/432; 269/901, 289 R; 16/21; 248/169; 433/77, 79; 312/20, 21, 22, 23, 24, 27, 196, 197, 209, 253, 254, 328; 108/144–150; 280/47.35, 79.3

[56] References Cited

U.S. PATENT DOCUMENTS

| 158,880 | 1/1875 | Archer | 108/145 |
|---|---|---|---|
| 316,100 | 4/1885 | White | 108/145 X |
| 2,173,950 | 9/1939 | Parkhill | 16/21 |
| 2,175,288 | 10/1939 | Florang | 248/129 |
| 2,438,829 | 3/1948 | Skolnik | 280/47.35 X |
| 2,596,986 | 5/1952 | Curtis | 108/144 X |
| 2,900,659 | 8/1959 | Snell | 16/21 |
| 3,084,376 | 4/1963 | Strohmeier | 16/21 |
| 3,152,833 | 10/1964 | Creveling et al. | 108/144 X |
| 3,210,846 | 10/1965 | Balkin | 108/147 X |
| 3,271,859 | 9/1966 | Horowitz et al. | 312/209 X |
| 3,302,971 | 2/1967 | Lory | 108/145 X |
| 3,802,002 | 4/1974 | Jonas | 108/147 X |
| 4,249,900 | 2/1981 | Hoelzer et al. | 433/79 |
| 4,416,634 | 11/1983 | Beach | 312/209 X |
| 4,607,897 | 8/1986 | Schwartz | 312/209 |
| 4,715,573 | 12/1987 | Liegel | 248/129 |
| 4,948,077 | 8/1990 | Gonzalez | 248/129 |

FOREIGN PATENT DOCUMENTS

| 1923998 | 2/1965 | Fed. Rep. of Germany . |
| 2451618 | 5/1976 | Fed. Rep. of Germany . |
| 7516676 | 11/1976 | Fed. Rep. of Germany . |
| 2053255 | 6/1979 | Fed. Rep. of Germany ...... 434/263 |
| 3127614 | 1/1983 | Fed. Rep. of Germany ...... 434/263 |

Primary Examiner—Robert Bahr
Attorney, Agent, or Firm—Scully, Scott, Murphy & Presser

[57] ABSTRACT

Dental teaching and practicing apparatus for the simulation and practice of dental-clinical working or operating procedures, such as are generally employed for the education and training of dentists and their assistants. The apparatus which represents or incorporates a patient-simulator can be individually positioned, especially with consideration being given to limited space or place conditions, whereby during non-use thereof the apparatus can be brought into a space-saving stored position, and can also be set up in such a manner that within an unchanged assembly, it is comfortable for either a right-handed or left-handed person.

12 Claims, 4 Drawing Sheets

DENTAL TEACHING AND PRACTICING APPARATUS

BACKGROUND OF THE INVENTION

1. Field of the Invention

The present invention relates to dental teaching and practicing apparatus for the simulation and practice of dental-clinical working or operating procedures, such as are generally employed for the education and training of dentists and their assistants.

2. Discussion of the Prior Art

An apparatus of that type has become known from the disclosure of German Patent 24 51 618. This apparatus consists of a stationary base member for the apparatus with the provision of instrument carriers which are articulatedly connected thereto. The entire apparatus necessitates the taking up of a significant amount of space inasmuch as it is not adapted for movement or repositioning and, consequently, even during non-use remains standing in one and the same place, and consequently even then necessitates the taking up of a significant amount of space. It is practically impossible for the students to be able to relocate this known apparatus into a presently expedient position for enabling the implementation of a particular work procedure. Moreover, it also is not adapted to be set up in such a manner so as to be expediently positioned for either a left-handed or right-handed person.

SUMMARY OF THE INVENTION

Accordingly, it is an object of the present invention to provide a dental teaching and practicing apparatus of the above-mentioned type in which, pursuant to a flexible mode, the apparatus which represents or incorporates a patient-simulator can be individually positioned, especially with consideration being given to limited space or place conditions, whereby during non-use thereof the apparatus can be brought into a space-saving stored position, and can also be set up in such a manner that within an unchanged assembly, it is comfortable for either a right-handed or left-handed person.

The foregoing object is inventively attained in that the apparatus is constructed so as to be movable from location to location.

The foregoing provides the advantages that the apparatus can be moved into a stored position during non-use thereof, in which it requires only a small amount of space, and that for the use of the apparatus it can be moved into every suitable position required without the expenditure of any considerable effort, whereby in dependence upon need there can be taken into consideration the selective employment of the apparatus by either a right-handed or left-handed person.

BRIEF DESCRIPTION OF THE DRAWINGS

Further features and advantages of the invention can now be more readily ascertained from the following detailed description of exemplary embodiments thereof, taken in conjunction with the accompanying drawings; in which.

DETAILED DESCRIPTION

Figure 1:
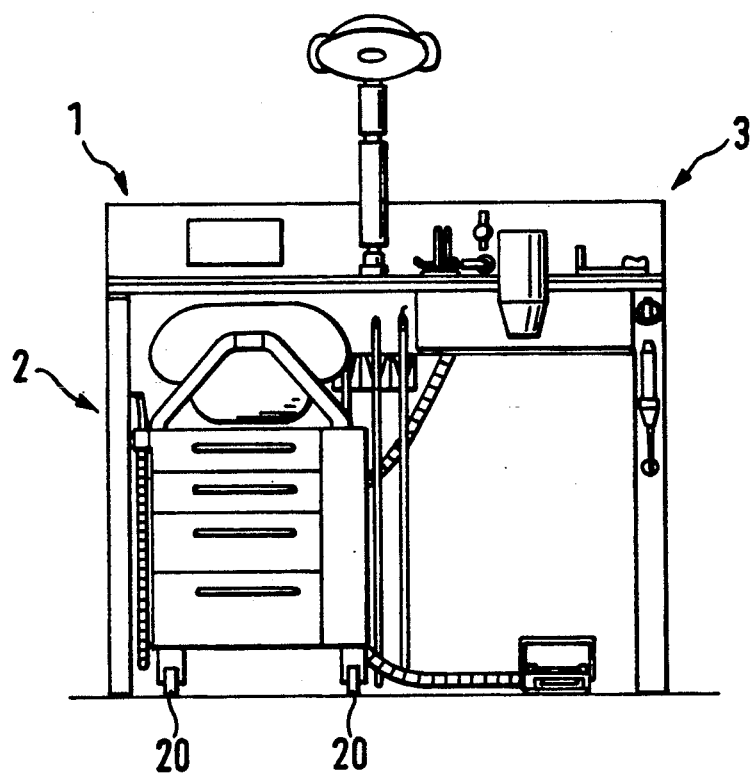
FIG. 1 illustrates an arrangement of the inventive apparatus within a combination of various apparatuses.

The apparatus combination 1, as shown in FIG. 1, consists of a movable or relocatable dental teaching and practicing apparatus 2, as well as a stationary dental-technician teaching and practicing apparatus 3. The apparatus 2 is hereby introduceable into an open space provided in the apparatus 3 beneath the work surface thereof. This arrangement corresponds to the space saving parked or stored, or essentially non-use position. For purpose of the displacement or movement, the apparatus 2 is equipped with rollers 20. However, of the rollers, there can also be provided skids or the like on the apparatus.

In an advantageous embodiment, the movable apparatus 2 can possess a smaller constructional size than the known teaching and practicing apparatuses employed for dental-clinical operating procedures.

Figure 3C:
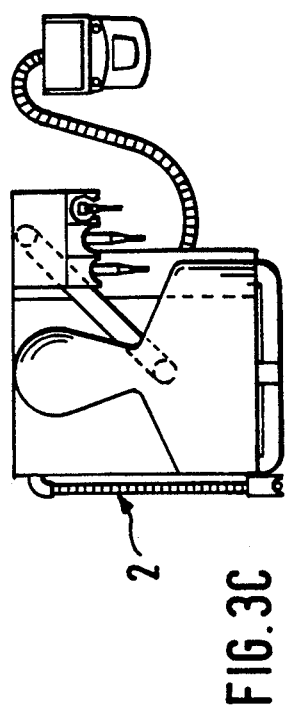
FIG. 3c illustrates the apparatus of FIG. 3a shown in a top plan view.
Figure 3B:
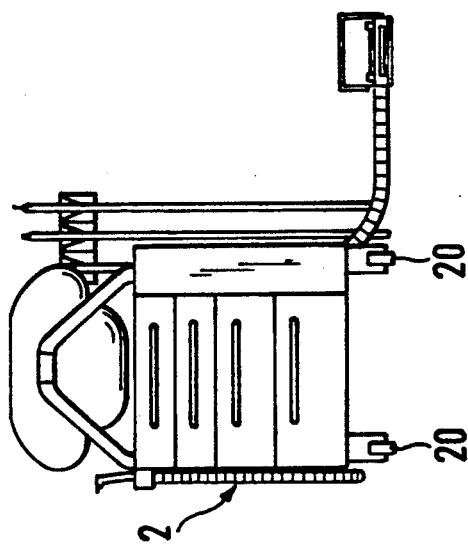
FIG. 3b illustrates the apparatus of FIG. 3a shown in a front elevational view.
Figure 3A:
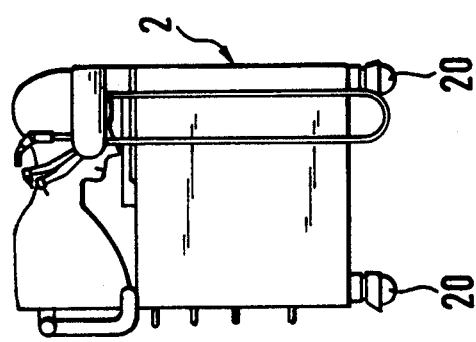
FIG. 3a illustrates the inventive apparatus by itself in a side elevational view.
Figure 2:
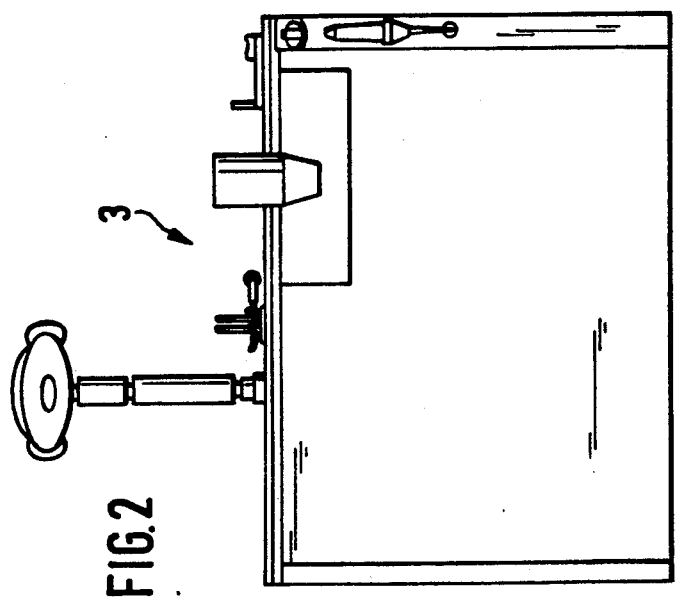
FIG. 2 illustrates the apparatus in itself located fixed relative to the combination.
Figure 4:
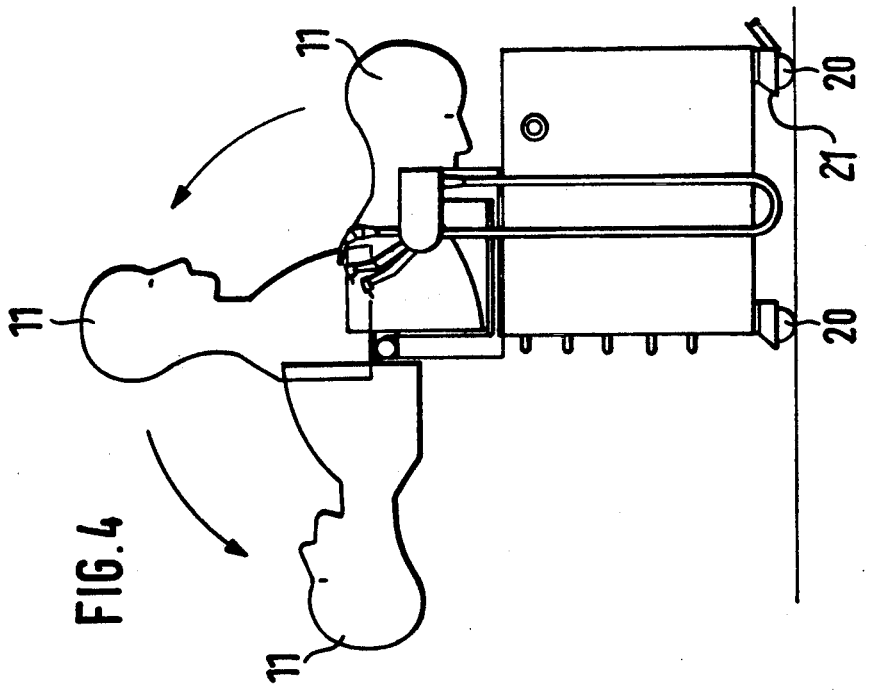
FIG. 4 illustrates the inventive apparatus shown in different work or operative positions.

For enabling the employment thereof, the apparatus 2, as shown in FIGS. 3a to 3c, can be withdrawn from the apparatus 3 (FIG. 2). FIG. 4 illustrates the apparatus 2 in different operating positions, whereby a phantom head 11 is shown as being either in a position in which is tilted towards the right for the insertion of the apparatus 2 beneath the work surface of the apparatus 3, or in a vertical or in a position in which is tilted towards the left for the undertaking of work or operating procedures. In all constructions thereof does the apparatus 2 possess the rollers 20, which are pivotable about a vertical axis, so as to facilitate the carrying out of a controlled traveling movement. For the same purpose, the rollers, which are not shown, can also have the form of balls which are guided within ball sockets or cups.

In order to ensure that the apparatus 2 which has been moved into its work position will not by itself change its position, at least one of the rollers 20 can be fixable secured against movement. For this purpose, there is provided a friction brake 21 or essentially a brake shaped in conformance with the roller surface so as to be able to engage the latter in surface contact, which can expediently be locked through the operation of a pedal; for example, such as shown in Suell U.S. Pat. No. 2,900,659.

Figure 5B:
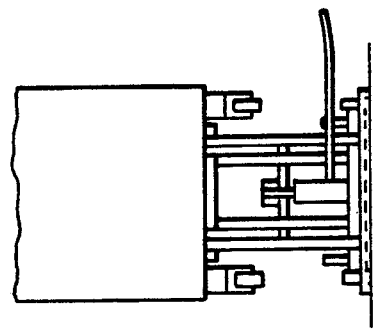
FIG. 5b illustrates the lower portion of the apparatus of FIG. 5a in a front view.
Figure 5A:
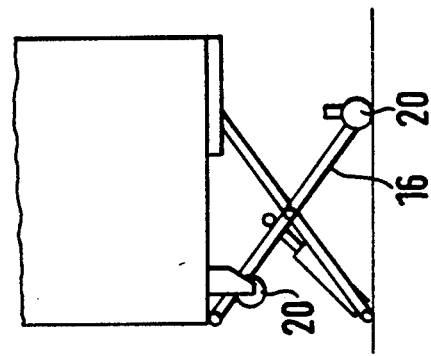
FIG. 5a illustrates the lower portion of the apparatus of FIG. 4 in a side view.

For effectuating the attachment of the rollers to the apparatus, there are afforded the following possibilities: Either the rollers are mounted on the apparatus 2 itself, or on a scissors linkage arrangement 16 which serves for the adjustment in height of the apparatus 2, or the arrangement of two rollers 20 on the apparatus 2 itself and two rollers 20 on the scissors linkage arrangement 16, as shown in FIG. 5a. In the last two cases, it is possible to also move the apparatus 2 to different positions even at an undertaken adjustment in height.

Figure 6:
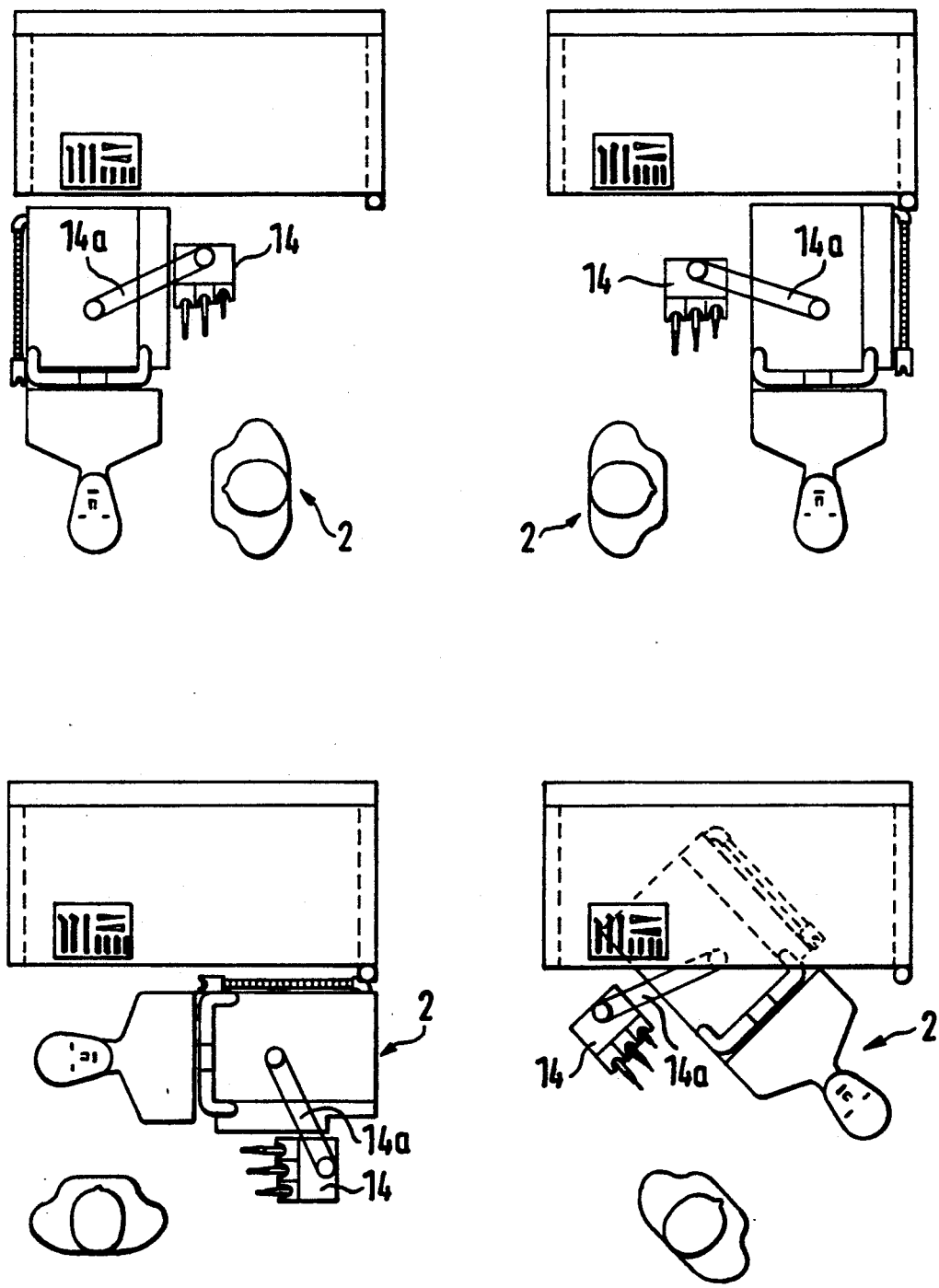
FIG. 6 illustrates four different positions which can be assumed by the inventive apparatus.

As can be ascertained from FIG. 6, the apparatus 2 can assume all possible positions in accordance to the manner in which this is required for the work procedure which is to be undertaken; for example, in dependence upon the illumination. Hereby, there can also be given consideration to the different requirements of right-handed, as well as of left-handed persons. In this case, it is expedient that the apparatus be equipped with a carrier or holder 14 for dental instruments which is displaceable on a pivot arm 14a through an angle of at least 180°. Thereby, the operating person can draw the carrier 14 towards himself such that the instruments, irrespective as to whether the person is either right-handed or left-handed, can be readily reached in an optimally comfortable manner.

What is claimed is:

1. In a dental teaching and practicing apparatus including a phantom head for the simulation and practicing of dental-clinical working procedures, said apparatus being movable on rollers; the improvement comprising a scissors linkage arrangement (16) for adjusting the height of the apparatus (2), said rollers (20) being mounted on said scissors linkage arrangement (16), said rollers (20) each being pivotable about a vertical axis, and brake means for securing at least one of said rollers (20) against movement.

2. Apparatus as claimed in claim 1, wherein said brake means comprises a friction brake.

3. Apparatus as claimed in claim 1, wherein a pivot arm on said apparatus mounts a carrier for dental instruments for pivotal movement through an angle of at least 180°.

4. In a dental teaching and practicing apparatus including a phantom head for the simulation and practicing of dental-clinical working procedures, said apparatus being movable on rollers; the improvement comprising a scissors linkage arrangement (16) for adjusting the height of the apparatus (2), said rollers (20) being mounted on said scissors linkage arrangement (16), said rollers being balls guided in ball socket joints, and brake means for securing at least one of said rollers against movement.

5. Apparatus as claimed in claim 4, wherein said brake means comprises a friction brake.

6. Apparatus as claimed in claim 4, wherein a pivot arm on said apparatus mounts a carrier for dental instruments for pivotal movement through an angle of at least 180°.

7. In a dental teaching and practicing apparatus including a phantom head for the simulation and practicing of dental-clinical working procedures, said apparatus being movable on rollers; the improvement comprising a scissors linkage arrangement (16) for adjusting the height of the apparatus (2), a pair of said rollers (20) being mounted on the apparatus (2) and a further pair of said rollers (20) being mounted on the scissors linkage arrangement (16), said rollers (20) each being pivotable about a vertical axis; and brake means for securing at least one of the rollers (20) against movement.

8. Apparatus as claimed in claim 7, wherein said brake means comprises a friction brake.

9. Apparatus as claimed in claim 7, wherein a pivot arm on said apparatus mounts a carrier for dental instruments for pivotal movement through an angle of at least 180°.

10. In a dental teaching and practicing apparatus including a phantom head for the simulation and practicing of dental-clinical working procedures, said apparatus being movable on rollers; the improvement comprising a scissors linkage arrangement (16) for adjusting the height of the apparatus (2), a pair of said rollers (20) being mounted on the apparatus (2) and a further pair of said rollers (20) being mounted on the scissors linkage arrangement (16), said rollers being balls guided in ball socket joints, and brake means for securing at least one of said roller against movement.

11. Apparatus as claimed in claim 10, wherein said brake means comprises a friction brake.

12. Apparatus as claimed in claim 10, wherein a pivot arm on said apparatus mounts a carrier for dental instruments for pivotal movement through an angle of at least 180°.

* * * * *